Patented Aug. 7, 1951

2,563,014

UNITED STATES PATENT OFFICE 2,563,014

PREPARATION OF CARBOHYDRATE POLYMERIC MATERIALS

Harry W. Durand, Glenshaw, Pa., assignor to Corn Products Refining Company, New York, N. Y., a corporation of New Jersey No Drawing. Application February 1, 1950, Serial No. 141,863

9 Claims. (Cl. 127—34)

This invention relates to a novel carbohydrate material derived from starch conversion sirups and to a process for preparing the same.

More particularly the invention relates to the production, from corn starch conversion sirups, of modified carbohydrate materials having dextrin-like properties and being eminently useful as adhesives or as adhesive components.

While ordinary corn starch and modifications thereof, such as dextrins and thin-boiling starches, have desirable properties for many purposes, they are not entirely satisfactory for certain purposes because the inherent tendency of their aqueous solutions to thicken or gel within a relatively short time. Where stability is a prime factor, pastes and solutions made from corn starch are less desirable than those made from certain other starch materials as tapioca, for example. This is particularly true where the materials are to be used for adhesive or sizing purposes. In this connection, it is well recognized that corn starch and the products thereof possess, on the one hand, excellent adhesive and sizing properties, but, on the other hand, such products are deficient in stability, that is, they have a tendency to thicken or gel. It is further known that polymerized products, for example, those derived from the heating of simple sugars, such as glucose and the like, while being quite stable, are deficient in adhesive and sizing properties. Furthermore, such latter products are difficult to manufacture and frequently there is produced an end product which is dark in color, humectant and of poor film-forming properties. These characteristics result in part from the tendency of such simple sugars to caramelize to yield products which interfere with the desired polymerization reaction.

Accordingly, it is an object of the present invention to provide a novel carbohydrate material having properties which make it eminently suitable for use as an adhesive.

A further object is to provide an improved adhesive material from starch conversion sirups, the product being characterized by high degree of water solubility and compatibility with animal glues.

Another object is to provide an adhesive material derived from corn starch conversion sirups having desirable dextrinlike properties, remoistening adhesive properties, good stability, and high solubility in water coupled with compatibility with animal glues.

The present invention is based on the concept that differences in the paste properties of starches from various sources, as for example, between corn and tapioca products, are due to differences in molecular configurations.

Recognizing that corn starch and the products thereof have good adhesive and sizing properties for most uses but are deficient in stability, while conventional heat polymerized products, such as are derived from simple sugars like glucose, have good stability characteristics but are lacking in adhesive properties and difficult to manufacture, the present invention contemplates the partial depolymerization of corn starch to a degree such that the inherent instability of the starch disappears, followed by a subsequent heat polymerization step. The products made according to my invention on the above described concept are found to have many characteristics in common with the dextrins and the soluble starches derived from tapioca, and have little or none of the instability characteristics generally ascribed to corn starch products.

Generally, the method of my invention involves the following operations:

Step I.—Dehydrating a starch conversion sirup to isolate the solid material therein.

Step II.—Heating the isolated solid under conditions conducive to polymerization.

It is desirable, during step II, that the heating be done in the presence of an acidic material which functions as a catalyst. Such catalyst material may be already present in the sirup prior to dehydration or it may be added subsequently thereto. Under some conditions, it may be considered more desirable to have the catalyst in the sirup prior to drying whereby the drying operations may be facilitated and sufficient polymerization promoted during step I to enable the dried product to be heated in step II without danger of caking, caramelization and the like. With sirups having dextrose equivalent values (D. E.) of less than 40, the catalyst can be conveniently added to the dried solids just prior to step II. The term "D. E," as used herein, refers to percent of reducing sugar, calculated as dextrose, dry basis.

Any type of acid catalyst can be used which promotes the polymerization reaction. In those cases where catalyst is added to the sirup prior to step I, I prefer to use a weak non-volatile acid such as, for example, boric, phosphoric or the like. In those cases where the catalyst is to be added to the dried solids prior to step II, I prefer to use a strong volatile acid or a material liberating such an acid, for example, hydrochloric acid, aluminum chloride and the like.

I have found that the pH of the sirup solids has a most important effect on the smoothness with which step II proceeds. In this connection, I have found that regardless of the strength of the acid material used, its concentration should be such as to give a pH (determined on 10 percent aqueous solution of the acidified sirup solids) in the range of from about 2.0 to about 3.0.

Higher pH values necessitate undue lengthening of the operation time required for step II; lower pH values increase the tendency toward darkening of the product and caramelization during step II.

While any suitable form of drying may be used in step I, I have found spray drying very satisfactory for this purpose, in that the operation is simple, economical and easy to control. Such spray drying may be accomplished satisfactorily by (1) feeding the sirup under pressure through a spray nozzle into a drying chamber, or (2) feeding the sirup either by gravity or by a pump feed to a rapidly rotating spray head which shears and disperses the sirup in the form of fine spray throughout the drying chamber. As a practical matter, spray drying is best carried out when the D. E. value of the sirup is less than about 40. In the case of sirups having higher D. E. values, other methods of drying are preferable as, for example, vacuum drying followed by grinding of the solids to powder form. Roll drying methods may also be used, particularly in the case of sirups having low D. E. values, for example, of the order of about 5 percent.

The degree of dehydration to be effected in step I will vary according to the compositional character of the sirup being dried. The product should be dry enough so that it may be agitated readily without gumming or lumping during the subsequent step II. Depending on the D. E. value of the sirup used, the moisture content of the dried material may be as much as 10 percent in the case of a 5 D. E. sirup, for example, while in the case of 40 to 60 D. E. sirup, the moisture is preferably much less. The more complete the dehydrating—other things being equal—the smoother will be the operation of step II. While generally, as stated above, the moisture content may vary from about 1 to 10 percent, spray dried products, in practice, having a moisture content of about 7 percent or less have been found to be entirely satisfactory.

Although I prefer to use corn or other starch conversion sirups which have been made by acid hydrolysis, enzyme converted sirups may also be used, provided only that such sirups can be satisfactorily dried.

The temperature at which the polymerization reaction takes place in step II must be carefully regulated to promote the proper rate of polymerization and water formation. Temperature regulation is necessary in order to permit the water, which is formed as a result of the chemical condensation involved, to be continuously removed. The absence of such regulation may result in the interference of polymerization by side reactions, such as hydrolysis and caramelization, resulting from the presence of moisture in the reaction mixture. Among the types of equipment that can be used in step II, are heat jacketed kettles, commonly employed in the commercial cooking of dextrins, tray dryers, conveyor belt dryers, and the like. While the temperature change and time cycles will be somewhat variable, depending on the particular characteristics of equipment used, generally it will be found most satisfactory to carry out step II within a temperature range from about 100° C. to about 200° C. At lower temperatures the polymerization reaction will proceed very slowly under the previously specified pH conditions, whereas higher temperatures promote a tendency toward color formation, caramelization and other undesirable side effects. In some cases, it may be desirable to carry out step II at a lower temperature, say at 90° C. to 100° C., in order to first remove residual moisture from the product. Such a pre-drying step minimizes any tendency for the product to lump or fuse on subsequent polymerization at the higher temperatures.

The time required to carry out step II will depend upon the temperature used and the moisture content, the D. E. value, and the pH of the material undergoing treatment. As already mentioned, lower temperatures require longer heating times than higher temperatures. However, higher pH values require longer polymerization times than lower pH values. When the temperature is about 160° C., the shortest period of time required to obtain the necessary degree of polymerization to result in a product useful for the purposes aforementioned is about one hour; when the temperature is about 130° C., the time required is about 2 to 5 hours. When the temperatures aforementioned are used, it is not practical to heat the material longer than 8 hours. Where the starting material has a low moisture content, the polymerization proceeds faster than at high moisture contents.

Due to the large number of combinations of temperature, moisture and pH factors possible under the present invention and the wide variety of products which it is possible to produce in accordance therewith, it is not feasible to attempt to set forth the exact operating conditions for each product possible of production. The examples and the description set forth in the specification will enable persons skilled in the art to select the conditions of treatment best suited to obtain the products they desire.

The sirups which I have found preferable are those which have D. E. values within the range of about 5 to about 40. Higher D. E. values than this frequently result in considerable difficulties in manufacture, particularly, in drying the product, while lower D. E. values frequently produce products which have a tendency to thicken or gel.

The table below illustrates the general effect of the D. E. value of the sirup on the properties of the products finally derived therefrom:

Table

| Property | Trend of Property in Polymers from Solids of— | |
|---|---|---|
|  | D. E. 5 | D. E. 40 |
| Water solubility | Low to | High. |
| Viscosity in aqueous solution | High to | Low. |
| Adhesive and cohesive strength | High to | Low. |
| Stability of solution viscosity | Low to | High. |
| Humectancy | Low to | High. |
| Compatibility with animal glue | Low to | High. |

It is seen from the above table, that the products which are derived from sirups in the lower end of the specified D. E. range are better suited for general adhesive purposes and for such purposes as textile and paper sizing, whereas those which are derived from sirups having high D. E. values have value as animal glue replacements and in those applications where high fluidity coupled with high holids is important.

Generally speaking, I have found that the products which are derived from sirups having intermediate D. E. values, say from about 20 to about 30, have the greatest all around value as adhesives in that they incorporate excellent fluidity and stability at high solids concentration with good film strength and adhesiveness. The remoistening adhesive properties of these products are particularly good. I have further found that the addition of borax to products derived according to the present invention increases the adhesiveness and the viscosity of pastes made therefrom. Furthermore, materials such as alkali silicates, as well as other additives, may be added to further improve certain adhesive properties of the products formed according to the process of my invention.

My invention will be more fully understood in the light of the following specific examples which are set forth below by way of illustration only, and are not intended to be limiting.

*Example I*

To a starch conversion sirup having a D. E. value of 40 and solids content of 70 percent was added 5 percent of powdered boric acid (based on the solids). The mixture was heated under agitation until homogeneous and then pumped to the chamber of a conventional spray dryer of countercurrent air flow type through an atomizing nozzle selected to give maximum feed rate under conditions using an air inlet temperature of 350° F. and an outlet temperature ranging from 250° to 280° F. at a feed pressure in the spray nozzle of 4000 p. s. i.

The spray dried product so produced was then charged into a conventional dextrin cooker, heated by steam jacket, and subjected to the following time-temperature cycle under continuous agitation.

| Total Time of Operation | Jacket Steam Pressure (p. s. i.) | Charge Temperature (°F.) |
|---|---|---|
| Start | 40 for 1½ Hours | ca. 100 |
| 1½ Hours | 80 for 1½ Hours | ca. 200 |
| 2¾ Hours | 120 for 1½ Hours | ca. 250 |
| 4½ Hours | | ca. 300 |

At the end of 4½ hours the process was stopped. The product was a tan colored material having little or none of the sweet taste of the original product and showing 14 percent reducing sugars as compared with the 40 percent figure obtained on the spray dried product.

The product was found to be completely soluble in cold water. Its aqueous solutions on evaporation gave coatings showing remoistening adhesive properties. The product was compatible in all proportions with corn and tapioca dextrins and with animal glue in aqueous solution and in films deposited from aqueous solution. Aqueous solutions of the product have shown no tendency to gel or increase in viscosity over extended storage periods at high solids (in excess of 60 percent). Addition of alkali to aqueous solutions of the product produced increase of viscosity and stringing tendency (presumably from the effect of borax or borate formation).

*Example II*

About 165 lbs. of corn starch conversion sirup having a D. E. value of 40 and a solids content of 80 percent were placed in a 20 gallon stainless steel container. About 6.6 lbs. of powdered boric acid (5 percent based on sirup solids) were added and dissolved by heating. The acidified sirup was transferred to a reservoir and fed therefrom by gravity onto the rotating head of a spray dryer. The temperature of the sirup was kept at about 50° C. The following time-temperature cycle was used:

| Time | Inlet Temp. (° C.) | Dryer Chamber Temp. (° C.) | Dryer Floor Temp. (° C.) | Outlet Temp. (° C.) |
|---|---|---|---|---|
| Start | 282 | 126 | 108 | 110 |
| 10 Min | 288 | 130 | 122 | 118 |
| 35 Min | 294 | 138 | 127 | 125 |
| 60 Min | 294 | 139 | 128 | 125 |

Yield of product=about 100%; D. E. value=35.

The spray dried product was then subjected to the following heating cycle in an oil jacketed container under agitation:

| Time of Heating | Jacket Temp. (° C.) | Charge Temp. (° C.) |
|---|---|---|
| Start | 99 | |
| 70 Min | 122 | |
| 105 Min | 145 | |
| 150 Min | 158 | 150 |
| 180 Min | 166 | 158 |

Yield of product=92%; D. E. value=18.5.

This product showed the same general properties as that described under Example I.

*Example III*

A sample of spray dried solids from a corn starch conversion sirup having a D. E. value of 19–20 was acidified by addition of 0.2 percent phosphoric acid and subjected to the following heating cycle in an oil jacketed container under constant agitation:

| Time of Heating | Jacket Temp. (° C.) | Charge Temp. (° C.) |
|---|---|---|
| Start | 108 | |
| 1 Hour | 143 | 130 |
| 2 Hours | 160 | 147 |
| 3 Hours | 159 | 148 |

Yield of product=93%; D. E. value=14.3.

The product was less water soluble than that of Example I, but was readily pasted by heating to give stable solutions of somewhat higher viscosity than those of the product of Example I. The compatibility of the product with a solution animal glue was limited but was complete with tapioca and corn dextrins. The product showed remoistening adhesive character superior to that of Example I.

*Example IV*

The spray dried solids from a corn starch conversion sirup having a D. E. value of 19–20 was blended with gaseous hydrochloric acid to a pH of 2.5. The acidified product was then placed in trays and subjected to heat in an oven of the Proctor and Schwartz type using the cycle of one hour at 200° F. followed by 3 hours at 300° F.

Another batch of the same acidified sirup solids was subjected to the following four different heating cycles in a Proctor and Schwartz type drying oven with the following results:

| Cycle | Yield | Final D. E. Value |
|---|---|---|
| | Per cent | |
| 1 Hr. at 200° F., then 1 Hr. at 300° F | 91 | 10.4 |
| 1 Hr. at 200° F., then 2 Hrs. at 300° F | 93 | 8.9 |
| 1 Hr. at 200° F., then 3 Hrs. at 300° F | 93 | 8.5 |
| 1 Hr. at 200° F., then 4¼ Hrs. at 300° F | 93 | 8.3 |

Yield of product=96.5%; D. E. value=about 8.

All of the above products were found substantially completely soluble in hot and cold water. Solutions thereof were found to be completely stable and of excellent fluidity at solids as high as 67 percent. General adhesive properties were good. Products were found completely compatible with corn and tapioca dextrins and of about 50 percent compatibility with animal glue.

*Example V*

A sample of the spray dried solids produced from a 19-20 D. E. corn sirup was treated by heating for 1½ hours at 115° C. in an oil-jacketed kettle. Subsequent to this predrying treatment 0.3 percent of anhydrous aluminum chloride was added and heating continued in accordance with the following cycle:

| Time | Jacket Temp. (°C.) | Charge Temp. (°C.) |
|---|---|---|
| Start | 115 | 108 |
| ½ Hour | 133 | 122 |
| 1 Hour | 150 | 138 |
| 1½ Hours | 150 | 140 |

Yield of product=90%; D. E. value=about 7.3.

The product showed the same general behavior as that described under Example IV.

*Example VI*

To the spray dried solids from corn starch conversion sirup having a D. E. value of 5 was added gaseous nitrogen dioxide until the pH was 2.8. This product was then subjected to the following heating cycle in an oil jacketed container under constant agitation:

| Operation Time | Jacket Temp. (°C.) | Charge Temp. (°C.) |
|---|---|---|
| Start | 103 | 98 |
| ½ Hour | 128 | 123 |
| 1¼ Hours | 157 | 147 |
| 2 Hours | 165 | 157 |

Yield of product=90%; D. E. value substantially unchanged.

The product herefrom was much less soluble in hot and cold water than those of any of the previous examples. Pastes thereof were furthermore highly viscous and showed some lack of stability. Product was of highly adhesive character, surpassing tapioca dextrin as a remoistening adhesive for rag stock papers.

The products formed according to my invention have numerous and important advantages over other types of starch products, particularly for adhesive work. It is seen that the products formed according to the process of my invention have advantages over both corn and tapioca dextrins with regard to their compatibility with animal glues. Furthermore, my novel products are superior to corn and tapioca dextrin in stability and fluidity in aqueous solutions.

While the process of my invention has emphasized the use of corn starch conversion sirup, other starch conversion sirups such as, for example, sorghum, potato, rice, wheat, tapioca, may likewise be used with good results.

I claim:

1. A process for producing a novel carbohydrate material which comprises spray drying a corn starch conversion liquor having a D. E. value of from about 5 to about 40, heating the said dried product at a pH of from about 2.0 to about 3.0 and at a temperature not substantially under 100° C. nor substantially over 200° C., whereby to polymerize components of said product, and continuously removing water formed by the polymerization reaction during the said heating step.

2. A process for producing a novel carbohydrate material which comprises dehydrating a starch conversion liquor having a D. E. value of from about 5 to 40 to a moisture content below about 10 percent, heating the dried product in the presence of an acid catalyst and at a pH of from about 2.0 to about 3.0 and at a temperature between about 100° C. and 200° C. to permit chemical condensation of the components of said product, and continuously removing water vapor formed during the said heating step.

3. A process for producing a novel carbohydrate material which comprises dehydrating a starch conversion liquor having a D. E. value from about 5 to about 40, to a moisture content below about 10 per cent, heating the dried product in the presence of an acid catalyst and at a pH of from about 2.0 to 3.0, and at a temperature not exceeding about 200° C., to permit chemical condensation of the components of said product, and continuously removing water vapor formed during the said heating step.

4. A process for producing a novel carbohydrate material which comprises dehydrating a starch conversion sirup having a D. E. value of about 40 and containing about 5 per cent of boric acid (based on the solids), to a moisture content below about 10 per cent, and thereafter heating the dried product at a temperature within the range of about 30° C. to about 140° C. to permit chemical condensation of the components of said product, and continuously removing water vapor formed during the said heating step.

5. A process for producing a novel carbohydrate material which comprises dehydrating a starch conversion sirup having a D. E. value of about 19 to about 20, to a moisture content below about 10 per cent, blending with the dried product sufficient hydrochloric acid to adjust the pH thereof to 2.5 and thereafter heating the acidified product at a temperature within the range of about 90° C. to about 140° C. thereby to polymerize components of said product, and continuously removing water formed by the polymerization reaction during the said heating step.

6. Process according to claim 2 wherein the acid catalyst is hydrochloric acid.

7. Process according to claim 3 wherein the acid catalyst is hydrochloric acid.

8. Process according to claim 2 wherein the acid catalyst is boric acid.

9. Process according to claim 3 wherein the acid catalyst is boric acid.

HARRY W. DURAND.

REFERENCES CITED

The following references are of record in the file of this patent:

UNITED STATES PATENTS

| Number | Name | Date |
|---|---|---|
| 2,027,904 | Farber | Jan. 14, 1936 |
| 2,189,824 | Walsh | Feb. 13, 1940 |
| 2,387,275 | Leuck | Oct. 23, 1945 |
| 2,436,967 | Leuck | Mar. 2, 1948 |